Dec. 16, 1947.  H. C. SCHOMAKER  2,432,940
LIVE BAIT HOLDER
Filed Jan. 3, 1947

INVENTOR
HENRY C. SCHOMAKER
BY
ATTORNEYS

Patented Dec. 16, 1947

2,432,940

UNITED STATES PATENT OFFICE 2,432,940

LIVE BAIT HOLDER

Henry C. Schomaker, Calumet City, Ill.

Application January 3, 1947, Serial No. 719,959

3 Claims. (Cl. 43—41)

This invention relates to improvements in live bait harnesses and more particularly to frog harnesses.

Heretofore all harnesses of this type have been of an open or skeletal design, usually constructed of wire alone, or in combination with fish line and were as a general rule not adjustable with reference to the size of the frog.

The former harnesses also left almost the entire body of the frog unprotected and subject to constant rubbing and striking against vegetation and debris in the water thereby quickly maiming or killing the frog, and otherwise making him unsuitable as a bait.

In the type of harness employing a wire frame and fish line in combination it was found that the frog was soon so severely injured, by the tightening or cutting action of the line, that he quickly expired. When the frame type of harness was used for casting, the frog landed in the water with considerable force and being unprotected against the fall was stunned and soon died as a result thereof. In short, the lift of a frog, when harnessed in the heretofore used type of harness, was short and necessitated constant replacement.

The main objects of the invention are to provide an adjustable harness for live bait, especially adapted for use with bait such as frogs; to provide a device of this character which will encase the major portion of the frog's body; to provide a device of this character which is provided with a shield to prevent water from being forced into the frog's lungs; to provide a device of this character which will not cut into the frog's body; to provide a device of this character which will allow freedom of movement of the frog without possibility of the bait escaping from the harness; to provide a device of this character which will act as a buffer and thereby prevent the frog from being stunned when cast into the water; to provide a device of this nature which is simple and inexpensive to manufacture; to provide a device of this character which will lengthen the life of the frog, when used encased in a bait holder, and therefore, increase its utility; and to provide a harness of the class described which will accommodate various sizes of bait.

An illustrative embodiment of this invention is shown in the accompanying drawings in which.

Figure 3:
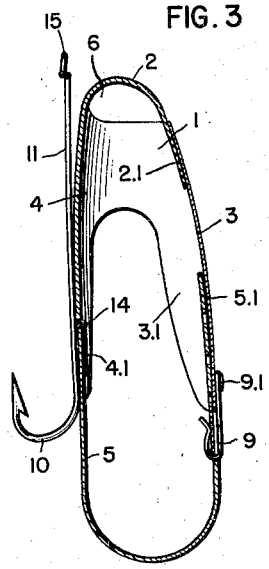
Fig. 3 is a sectional view taken on the line 3—3 of Fig. 2.

Referring in detail to the drawings, the harness is preferably constructed of clear plastic or a similar suitable material stamped from sheet form and comprises an annular collar 1, a front flap 2 integrally formed on the forward end of the bottom of the collar and extending forwardly therefrom, a body comprising a broad back portion 3 and a broad underside portion 4 having a rearwardly extending tail piece 5 integrally secured to the medial rear edge of underside or lower portion 4 and extending rearwardly therefrom.

The free end 2.1 of the flap 2 is bent up and back to meet the top forward end of the annular collar 1 where it is secured thereto in any suitable manner, such as by cementing, to substantially close the front end of the annular collar and form port holes 6 and 7 on each side of the body respectively and thereby form a protective head cap.

Figure 2:
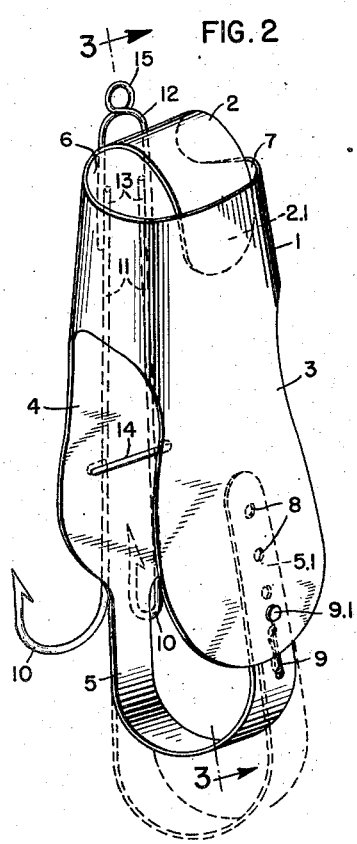
Fig. 2 is a perspective view illustrating the adjustability of the tail piece.

The back portion 3 is substantially U-shaped having its sides 3.1 bent slightly downwardly, as clearly illustrated in Fig. 3. The broad underside or lower portion 4 is also substantially U-shaped having its sides 4.1 bent slightly upwardly, as clearly illustrated in Fig. 3. The tail piece comprises a relatively narrow strap 5, one end thereof integrally secured to the back end of the underside portion 4 medially of its rear end. The free end 5.1 is provided with a plurality of apertures 8 adapted to be engaged by the snap clip 9 which is pivotally anchored to the underside of the back portion 3 by means of a rivet or the like 9.1 as clearly illustrated in Fig. 2.

Spaced hooks 10 having their extending shanks 11 secured to the free ends of the U-shaped frame 12, in any suitable manner such as by a weld 13, depend from the exterior face of the underside portion 4 and are secured thereto by a spacer bar 14, the free ends of which extend through suitable apertures in the underside portion 4 and are bent back upon themselves to form an anchoring clamp. The spacer bar also assures proper spacing of the hooks 10 and retains them in this position. The frame 12 is provided with a forwardly protruding line attaching eye 15.

Figure 1:
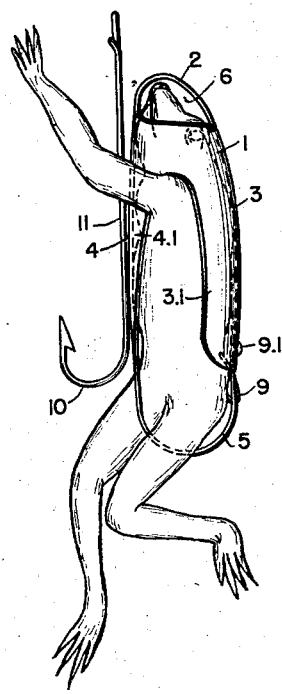
Figure 1 is a side elevational view showing a frog encased within the harness.

In use, a live frog is inserted between the back portion 3 and the underside portion 4 and into the annular collar 1. The tail piece 5 is placed between the frogs legs and pulled up tight, forcing the frog's head forwardly adjacent the front flap 2. The tail piece is then secured in place by inserting the clip 9 into the suitable aperture 8. The frog will then be securely encased within the harness, as illustrated in Fig. 1, and is ready for use.

It will be apparent from the foregoing description and the drawings, that as the back portion 3 and the broad underside portion 4 do not meet at any point and therefore, most of the frog's body from the neck rearwardly is exposed leaving the forelegs and rear legs free to move and yet preventing escape of the frog from the harness.

A line is secured to the eyelet 15 and the frog is ready to be used for trolling or casting. If a cast is made, the back portion 3 or the underside portion 4 will tend to strike the water first and absorb the shock thereby preventing the frog from being stunned. As the cast is retrieved, the protective head cap 2 prevents the water from rushing into the frog's nostrils or mouth and thereby prevents suffocation. The protective back portion 3, underside portion 4 and collar 1 will prevent the frog from being lacerated or otherwise injured by protecting the frog's body from being scraped against vegetation and debris in the water.

As the frog's legs and arms are left free for normal movements in the water and the harness is clear or colorless, the fisherman is enabled to keep a living, active, apparently unhampered bait in the water, and hence fish will be attracted thereto.

It will be apparent from the foregoing description and the drawings that the harness will accommodate various sizes of frogs and will in no way injure the frog by bearing against or cutting into his body, due to the adjustable tail piece 5.

It is to be understood that some of the details shown and described herein may be altered or omitted without departing from the spirit of this invention as defined by the following claims.

I claim:

1. A frog harness comprising an annular collar, broad back and underside portions of transparent material, an adjustable tail piece to accommodate various sizes of frogs in said harness, and a plurality of hooks depending from and secured to said underside portion.

2. A live frog harness comprising an annular collar, back and underside portions of transparent material, a tail piece having a plurality of apertures therein, a clip pivotally anchored medially to the said back adjacent its rear end adapted to engage the apertures in said tail piece, a plurality of hooks depending from said underside portion and a protective head cap on the forward end of said harness.

3. The device according to claim 3 wherein the forward end of said hooks are secured to a U-shaped frame having a line receiving eyelet integrally secured to the closed end thereof.

HENRY C. SCHOMAKER.

REFERENCES CITED

The following references are of record in the file of this patent:

UNITED STATES PATENTS

| Number | Name | Date |
|--------|------|------|
| 573,572 | Dales | Dec. 22, 1896 |
| 1,326,352 | Larson | Dec. 30, 1919 |